US012176602B2

(12) United States Patent
Fu

(10) Patent No.: US 12,176,602 B2
(45) Date of Patent: Dec. 24, 2024

(54) ELECTRONIC DEVICE

(71) Applicant: VIVO MOBILE COMMUNICATION CO., LTD., Guangdong (CN)

(72) Inventor: Xing Fu, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 151 days.

(21) Appl. No.: 17/990,590

(22) Filed: Nov. 18, 2022

(65) Prior Publication Data

US 2023/0082661 A1 Mar. 16, 2023

Related U.S. Application Data

(63) Continuation of application No. PCT/CN2021/094334, filed on May 18, 2021.

(30) Foreign Application Priority Data

May 20, 2020 (CN) ......................... 202010429809.1

(51) Int. Cl.

| | |
|---|---|
| ***H01Q 5/371*** | (2015.01) |
| ***H01Q 1/24*** | (2006.01) |
| ***H01Q 1/50*** | (2006.01) |
| ***H01Q 9/42*** | (2006.01) |

(52) U.S. Cl.

CPC ............... *H01Q 1/243* (2013.01); *H01Q 1/50* (2013.01); *H01Q 5/371* (2015.01); *H01Q 9/42* (2013.01)

(58) Field of Classification Search

CPC ......... H01Q 1/243; H01Q 5/371; H01Q 5/378

See application file for complete search history.

(56) References Cited

U.S. PATENT DOCUMENTS

| | | | |
|---|---|---|---|
| 5,917,450 | A | 6/1999 | Tsunekawa et al. |
| 7,183,983 | B2 | 2/2007 | Ozden |
| 9,337,532 | B2 | 5/2016 | Vanjani et al. |

(Continued)

FOREIGN PATENT DOCUMENTS

| | | | |
|---|---|---|---|
| CN | 1159664 | A | 9/1997 |
| CN | 1729593 | A | 2/2006 |

(Continued)

OTHER PUBLICATIONS

Extended European Search Report for Application No. 21808239.4, dated Sep. 13, 2023, 9 Pages.

(Continued)

*Primary Examiner* — Daniel Munoz

(74) *Attorney, Agent, or Firm* — BROOKS KUSHMAN P.C.

(57) ABSTRACT

An electronic device. An antenna module of this electronic device includes a plurality of antenna branches; a common feed structure is disposed between the plurality of antenna branches; the plurality of antenna branches are divided into a first group of antenna branches and a second group of antenna branches; the first group of antenna branches and the second group of antenna branches respectively correspond to different communication bands; and the common feed structure and the first group of antenna branches are disposed on an inner surface of a housing of the electronic device, and the second group of antenna branches are disposed on an outer surface of the housing of the electronic device.

9 Claims, 3 Drawing Sheets

(56) References Cited

U.S. PATENT DOCUMENTS

| | | | |
|---|---|---|---|
| 2004/0080457 A1 | 4/2004 | Guo | |
| 2008/0191954 A1 | 8/2008 | Tsujimura et al. | |
| 2009/0058737 A1 | 3/2009 | Tsujimura et al. | |
| 2012/0206303 A1 | 8/2012 | Desclos et al. | |
| 2014/0078017 A1 | 3/2014 | Vanjani et al. | |
| 2015/0270612 A1* | 9/2015 | Kang | H01Q 9/0407 343/872 |
| 2015/0349407 A1 | 12/2015 | Nishizaka et al. | |
| 2016/0028157 A1* | 1/2016 | Kim | H01Q 5/335 343/852 |
| 2018/0183139 A1 | 6/2018 | Liu et al. | |

FOREIGN PATENT DOCUMENTS

| | | |
|---|---|---|
| CN | 101383448 A | 3/2009 |
| CN | 108242589 A | 7/2018 |
| CN | 111555018 A | 8/2020 |
| JP | H09214244 A | 8/1997 |
| JP | 2008199309 A | 8/2008 |
| JP | 2013223199 A | 10/2013 |
| JP | 2015111763 A | 6/2015 |
| KR | 101765558 B1 | 8/2017 |

OTHER PUBLICATIONS

International Search Report and Written Opinion for Application No. PCT /CN2021/094334, dated Aug. 5, 2021, 8 Pages.

First Office Action for Japanese Application No. 2022-570270, dated Dec. 4, 2023, 6 Pages.

First Office Action for Korean Application No. 10-2022-7043619, dated Jan. 3, 2024, 5 Pages.

Second Office Action for Indian Application No. 202227073300, dated Jun. 13, 2024, 2 Pages.

Second Office Action for Japanese Application No. 2022-570270, dated May 7, 2024, 6 Pages.

* cited by examiner

ELECTRONIC DEVICE

CROSS-REFERENCE TO RELATED APPLICATIONS

This application is a continuation of International Application No. PCT/CN2021/094334 filed on May 18, 2021, which claims priority to Chinese Patent Application No. 202010429809.1, filed on May 20, 2020, which are incorporated herein by reference in their entireties.

TECHNICAL FIELD

Embodiments of this application relate to the field of communications technologies, and specifically, to an electronic device.

BACKGROUND

In the fourth generation mobile communication technology (4G) and the fifth generation mobile communication technology (5th generation mobile networks, 5th generation wireless systems, or 5th-Generation, 5G), multiple-in multiple-out (MIMO) is used to increase rate, which requires an electronic device to have a plurality of antennas. Based on the traditional 4G bands, Sub 6G bands, or 5G communication bands, are added, for example, bands N77, N78, N79, N1, and N41. In addition, to realize light and thin electronic devices with a high screen-to-body ratio, a constantly reduced space needs to be designed for antennas, bringing greater challenges to antenna layout and antenna solution design.

For the traditional antenna design solution, multi-frequency Sub 6G antennas are designed without changing the existing size and ultimate appearance. Due to the limited antenna space, the antennas are too close to each other. When the antennas are operating at nearby frequencies, their radiation arms are prone to affect each other, making tuning uneasy, which affects communication effect of the electronic device.

SUMMARY

The purpose of the embodiments of this application is to provide an electronic device, which can resolve the problem of poor communication effects of an existing electronic device caused by mutual interference between antennas on different bands as a result of a limited internal space of the electronic device.

To resolve the foregoing technical problem, this application is implemented as follows.

According to a first aspect, the embodiments of this application provide an antenna module including a plurality of antenna branches.

A common feed structure is disposed between the plurality of antenna branches.

The plurality of antenna branches are divided into a first group of antenna branches and a second group of antenna branches.

The first group of antenna branches and the second group of antenna branches respectively correspond to different communication bands.

The common feed structure and the first group of antenna branches are disposed in a non-metallic area of an inner surface of a housing of the electronic device, and the second group of antenna branches are disposed in a non-metallic area of an outer surface of the housing of the electronic device.

In the embodiments of this application, the second group of antenna branches are folded to a position such that they are not coplanar with the first group of antenna branches, facilitating a three-dimensional arrangement of the antenna branches. Such spatial multiplexing used, multiband coverage is implemented in a limited space, avoiding mutual interference between antennas on different bands, thus improving communication effect of the electronic device.

DETAILED DESCRIPTION

The following clearly and completely describes the technical solutions in the embodiments of this application with reference to the accompanying drawings in the embodiments of this application. Apparently, the described embodiments are only some but not all of the embodiments of the present invention. All other embodiments obtained by a person of ordinary skill in the art based on the embodiments of the present invention without creative efforts shall fall within the protection scope of the present invention.

In the specification and claims of this application, the terms “first”, “second”, and the like are intended to distinguish between similar objects rather than to describe a specific order or sequence. It should be understood that the terms used in this way are interchangeable in appropriate circumstances so that the embodiments of this application can be implemented in other orders than the order illustrated or described herein. In addition, in the specification and claims, “and/or” represents at least one of connected objects, and the character “/” generally indicates an “or” relationship between contextually associated objects.

The following describes in detail an antenna module provided in the embodiments of this application by using specific embodiments and application scenarios thereof with reference to the accompanying drawings.

Figure 1:
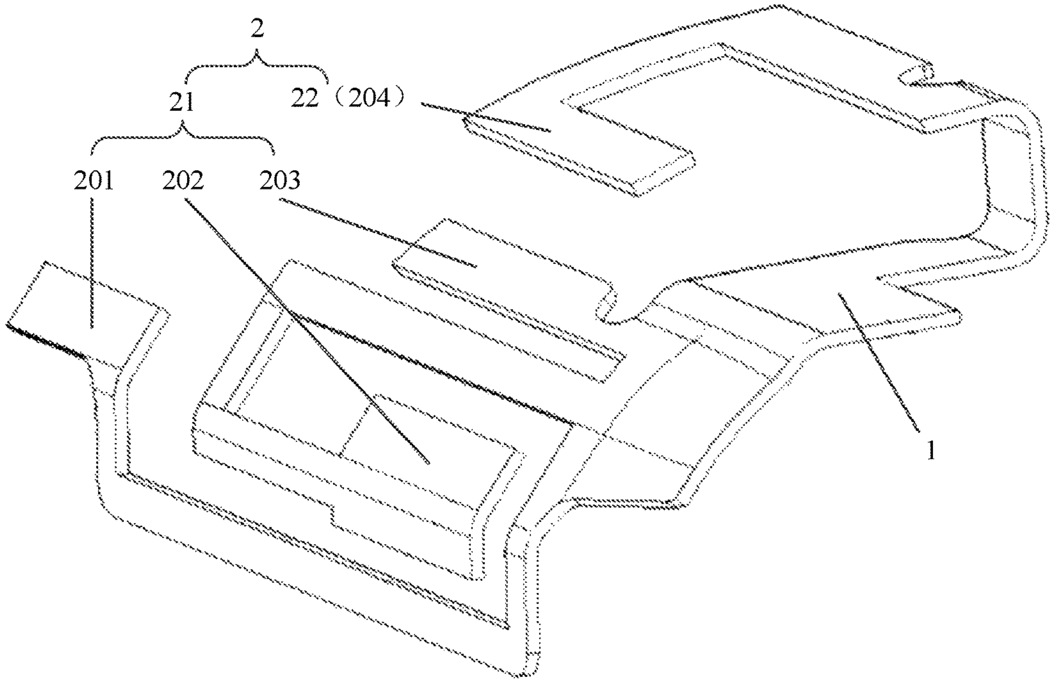
FIG. 1 is a first schematic structural diagram of an antenna module of an electronic device according to an embodiment of this application.

The embodiments of the present invention provide an electronic device. Referring to FIG. 1, an antenna module of the electronic device includes a plurality of antenna branches 2.

A common feed structure 1 is disposed between the plurality of antenna branches 2.

The plurality of antenna branches 2 are divided into a first group of antenna branches 21 and a second group of antenna branches 22.

The common feed structure 1 and the first group of antenna branches 21 are disposed in a non-metallic area of an inner surface of a housing of the electronic device, and the second group of antenna branches 22 are disposed in a non-metallic area of an outer surface of the housing of the electronic device, meaning the second group of antenna branches 22 are folded so as not to be coplanar with the first group of antenna branches 21. It should be noted that the housing of the electronic device is partly made of non-metallic material, for antenna wiring. The use of non-metallic material can avoid affecting radiation performance of the antenna branches. The other part of the housing of the electronic device may be made of metal material to improve structural strength of the electronic device and hand feel in using the electronic device.

The first group of antenna branches 21 and the second group of antenna branches 22 respectively correspond to different communication bands.

In the embodiment of this application, the plurality of antenna branches 2 extend outward from the common feed structure 1. The plurality of antenna branches 2 are divided into the first group of antenna branches 21 and the second group of antenna branches 22, where the first group of antenna branches 21 may include one or more antenna branches, and the second group of antenna branches 22 may also include one or more antenna branches. This embodiment of this application does not specifically limit the number of antenna branches in the first group of antenna branches 21 and that in the second group of antenna branches 22.

The second group of antenna branches 22 are folded to a position such that they are not coplanar with the first group of antenna branches 21, which implements spatial multiplexing. In addition, the first group of antenna branches 21 and the second group of antenna branches 22 respectively correspond to different communication bands, covering multiple 5G bands in a compact space, for example, bands such as N1 (2110 MHz-2170 MHz), N41 (2515 MHz-2675 MHz), N78 (3400 MHz-3600 MHz), and N79 (4800 MHz-5000 MHz).

In this embodiment of this application, the second group of antenna branches are folded to a position such that they are not coplanar with the first group of antenna branches, thus facilitating a three-dimensional arrangement of the antenna branches. Such spatial multiplexing used, multiband coverage is implemented in a limited space, avoiding mutual interference between antennas on different bands, thus improving communication effect of the electronic device.

In a practical application scenario, the foregoing antenna module is applied to an electronic device, for example, a mobile phone, a tablet computer, and a smart wearable device. In order to implement that the second group of antenna branches 22 are folded to a position such that they are not coplanar with the first group of antenna branches 21, it is possible that the first group of antenna branches 21 are disposed on the inner surface of the housing of the electronic device, for example, inner surface of a bracket of a mobile phone, and the second group of antenna branches 22 are disposed on the outer surface of the housing of the electronic device, for example, outer surface of the mobile phone, so that the branches are wired partly on the inner surface of the bracket and the rest on the outer surface of the bracket through folding or punching, thus implementing spatial multiplexing for the antenna module.

As can be understood, because the first group of antenna branches 21 and the second group of antenna branches 22 are respectively disposed on the inner surface of the housing of the electronic device and the outer surface of the housing of the electronic device, one or more antenna branches included in the first group of antenna branches 21 are located on a first plane or curved plane (depending on the shape of the inner surface of the housing of the electronic device), and one or more antenna branches included in the second group of antenna branches 22 are located on a second plane or curved plane (depending on the shape of the outer surface of the housing of the electronic device).

It should be noted that, the foregoing antenna module can be implemented by different techniques. For example, the flexible printed circuit (FPC) technique is used, where the common feed structure 1 and the plurality of antenna branches 2 are FPCs. For another example, the laser direct structuring (LDS) technique is used, where the common feed structure 1 and the plurality of antenna branches 2 are LDS antennas.

Further, each of the plurality of antenna branches 2 has a physical length corresponding to a different communication band.

In this embodiment of this application, the physical lengths of the antenna branches 2 are specified so that each of the antenna branches 2 in the antenna module corresponds to a different communication band, thereby achieving coverage of more bands.

The communication bands corresponding to the plurality of antenna branches include at least one of the following: N1 band, N41 band, N78 band, and N79 band.

Specifically, in the scenario shown in FIG. 1, the first group of antenna branches 21 include three antenna branches: a first antenna branch 201, a second antenna branch 202, and a third antenna branch 203, and the second group of antenna branches 22 include one antenna branch: a fourth antenna branch 204.

Physical length of the first antenna branch 201 corresponds to the N1 band, physical length of the second antenna branch 202 corresponds to the N41 band, physical length of the third antenna branch 203 corresponds to the N79 band, and physical length of the fourth antenna branch 204 corresponds to the N78 band. The common feed structure 1, the first antenna branch 201, the second antenna branch 202, and the third antenna branch 203 are all on the inner surface of the housing of the electronic device, and the fourth antenna branch 204 is folded so as to be wired on the outer surface of the housing of the electronic device, thus achieving multiband coverage in a compact space through spatial multiplexing.

It should be noted that the correspondence between antenna branches and communication bands is not fixed, and a person skilled in the art can adjust the physical lengths of the antenna branches according to actual product requirements so as to adjust the communication bands corresponding to the antenna branches.

Optionally, the communication bands corresponding to the plurality of antenna branches include at least one of the following: 2.4G WiFi band and 5G WiFi band.

In this embodiment of this application, the antenna branches can also be used as wireless fidelity (WIFI) MIMO antennas, thereby supporting bands such as the 2.4G WiFi and 5G WiFi bands.

Further, in some embodiments, two antenna branches with the shortest distance between the first group of antenna branches 21 and the second group of antenna branches 22 have a distance greater than or equal to 0.5 mm in a first direction, where the first direction is a direction of an orthographic projection of the second group of antenna branches 22 with respect to the first group of antenna branches 21.

In the embodiments of this application, while spatial multiplexing is implemented, in order to avoid interference between antenna branches that are not coplanar, it is necessary to limit the distance between antenna branches that are not coplanar.

The two antenna branches with the shortest distance between the first group of antenna branches 21 and the second group of antenna branches 22 mean that one antenna branch belonging to the first group of antenna branches 21 and the other antenna branch belonging to the second group of antenna branches 22 have the shortest linear distance. Specifically, in the scenario shown in FIG. 1, the two antenna branches with the shortest distance are the third antenna branch 203 and the fourth antenna branch 204 respectively, where it needs to be ensured that a distance of the fourth antenna branch 204 in a direction of an orthographic projection with respect to the third antenna branch 203 is greater than or equal to 0.5 mm. A longer distance means higher band performance achievable by a branch (that is, the fourth antenna branch 204) wired in a folding area. Further, considering ultimate appearance requirements of some electronic devices, optionally, the distance D in the first direction satisfies 0.5 mm≤D≤1.5 mm.

It should be noted that, depending on the shape of the housing of the electronic device, a plane on which the antenna branch is located may be inclined. On that basis, if two antenna branches located inside and outside the housing are parallel to and directly opposite each other, distance between the two antenna branches in the direction of the orthographic projection is right the distance between them, and the distance between the two antenna branches can be directly limited to be greater than or equal to 0.5 mm; and if two antenna branches located inside and outside the housing are not parallel to and not directly opposite each other, distance between the two antenna branches is not equal to their distance in the direction of the orthographic projection, and therefore it is necessary to limit the distance between the two antenna branches in the direction of the orthographic projection to be greater than or equal to 0.5 mm.

Further, in some embodiments, a band difference between communication bands corresponding to the two antenna branches with the shortest distance is less than a preset threshold, and the two antenna branches with the shortest distance have a distance greater than or equal to 0.5 mm in a second direction, where the second direction is perpendicular to the first direction.

The second direction being perpendicular to the first direction means that the second direction is perpendicular to a direction of an orthographic projection of the second group of antenna branches 22 with respect to the first group of antenna branches 21, and the second direction may also be referred to as a horizontal direction.

In the embodiments of this application, in addition to limiting the distance in the direction of the orthographic projection, distance in the horizontal direction also needs to be limited. Specifically, in the scenario shown in FIG. 1, the two antenna branches with the shortest distance are the third antenna branch 203 and the fourth antenna branch 204 respectively. For limitation of the distance between the third antenna branch 203 and the fourth antenna branch 204 in the horizontal direction, it is necessary to consider communication bands corresponding to the third antenna branch 203 and the fourth antenna branch 204. If a band difference between the communication bands corresponding to the third antenna branch 203 and the fourth antenna branch 204 is less than a preset threshold, the distance between the third antenna branch 203 and the fourth antenna branch 204 in the second direction is greater than or equal to 0.5 mm.

Whether the band difference between the communication bands is less than the preset threshold is used to determine whether the communication bands corresponding to the two antenna branches with the shortest distance are nearby bands. The preset threshold can be specified according to actual product requirements, and the preset threshold is not limited to any specific value in the embodiments of this application.

For example, the third antenna branch 203 wired on the inner surface of the housing corresponds to the N78 band, and the fourth antenna branch 204 folded over and wired on the outer surface of the housing corresponds to the N41 band, where the N78 band and the N41 band are nearby bands. In this case, the third antenna branch 203 and the fourth antenna branch 204 are required to have such a distance in the horizontal direction that they are as apart as possible (required to be greater than or equal to 0.5 mm) to avoid mutual impact between the two antenna branches, thus preventing performances of the two bands from deteriorating. For another example, the third antenna branch 203 corresponds to the N78 band, and the fourth antenna branch 204 folded over and wired on the outer surface of the housing corresponds to the N1 band, where the N78 band and the N1 band are not nearby bands. In this case, it is possible not to limit the horizontal distance between the third antenna branch 203 and the fourth antenna branch 204, so that that overlap of the everted wiring area is allowed, where the third antenna branch 203 can be wired in an orthographic projection area of the fourth antenna branch 204.

Figure 2A:
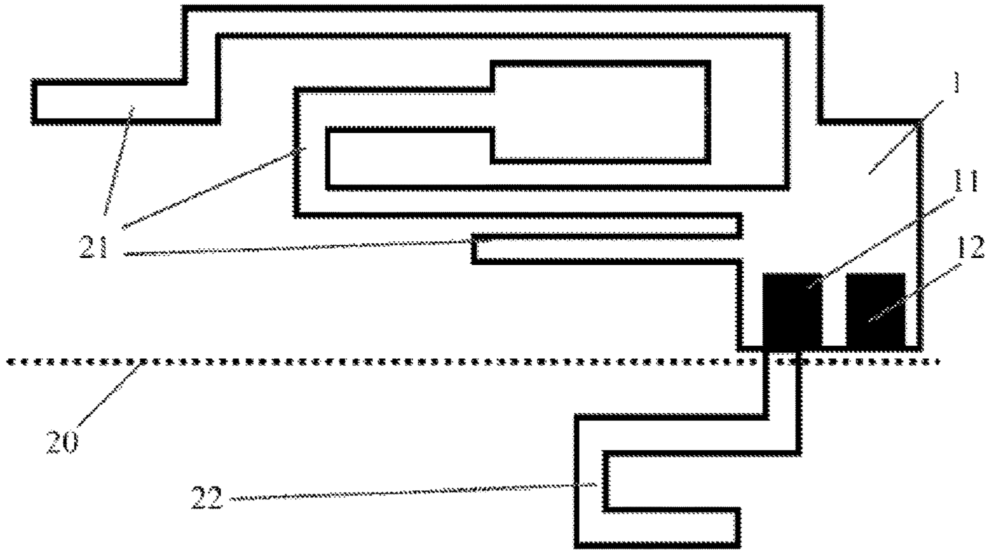
FIG. 2*a* is a second schematic structural diagram of an antenna module of an electronic device according to an embodiment of this application.
Figure 2B:
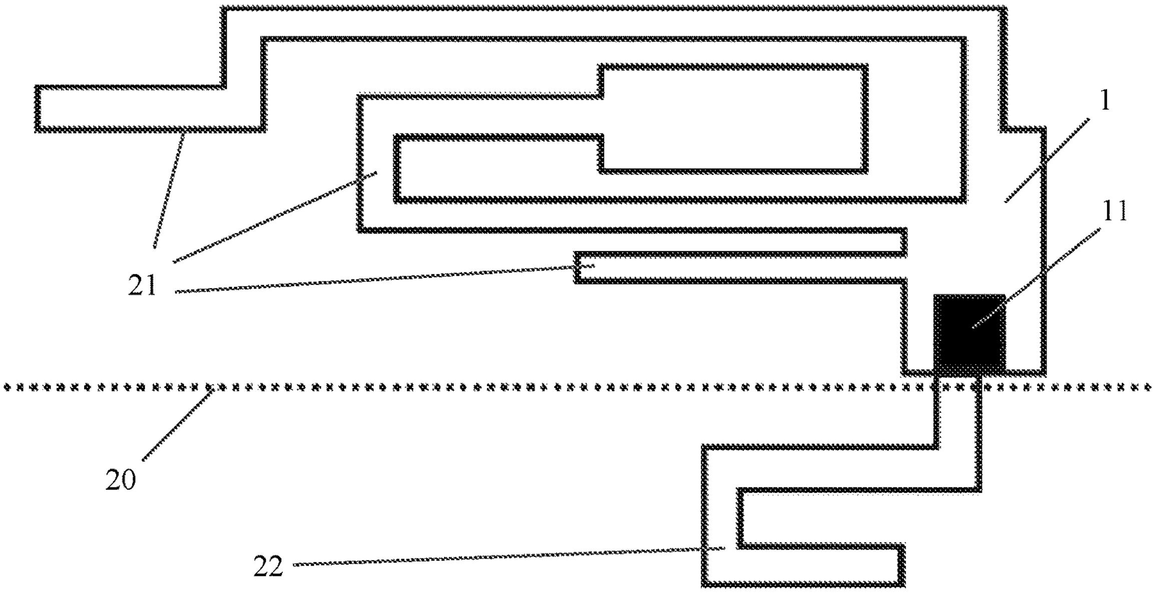
FIG. 2*b* is a third schematic structural diagram of an antenna module of an electronic device according to an embodiment of this application.

Referring to FIG. 2*a* and FIG. 2*b*, the figures show a structure after the three-dimensional antenna module shown in FIG. 1 is unfolded into a planar antenna pattern. A dotted line 20 is used to divide the first group of antenna branches 21 and the second group of antenna branches 22. One antenna branch in the second group of antenna branches 22 corresponds to any one of the N1 band, N41 band, N78 band, and N79 band. Three antenna branches in the first group of antenna branches 21 respectively correspond to the other three of the N1 band, N41 band, N78 band, and N79 band. Specifically, disposed above the dotted line are the first group of antenna branches 21 that are wired on the inner surface of the housing of the electronic device and the common feed structure 1, and disposed below the dotted line are the second group of antenna branches 22 that are wired on the outer surface of the housing of the electronic device. According to different types of the plurality of antenna branches 2, different connecting terminals need to be provided on the common feed structure 1.

Specifically, referring to FIG. 2*a*, in a case that the plurality of antenna branches 2 are inverted F antennas (IFA), the common feed structure 1 is provided with a feed terminal 11 and a ground terminal 12, where the feed terminal 11 is configured to be connected to a matching circuit, the matching circuit being configured to switch between communication bands for use.

In the embodiments of this application, in order to make the antenna branches IFA antennas, it is necessary to provide the common feed structure 1 with the feed terminal 11 and the ground terminal 12, where the feed terminal 11 is externally connected to the matching circuit, and the matching circuit may be an existing circuit including capacitors and/or inductors. The matching circuit includes a plurality of matching sub-circuits respectively corresponding to different antenna branches, and different matching sub-circuits are switched according to the antenna branch to be used. The specific structure of the matching circuit is not limited in the embodiments of this application. In this way, when different communication bands need to be used, the matching circuit can be used to switch to different antenna branches, thus achieving multiband coverage required for Sub 6G antennas.

Referring to FIG. 2*b*, in a case that the plurality of antenna branches are monopole (Monopole) antennas, the common feed structure 1 is provided with a feed terminal 11, where the feed terminal 11 is configured to be connected to a matching circuit, the matching circuit being configured to switch a working antenna branch among the plurality of antenna branches.

In the embodiments of this application, in order to make the antenna branches monopole antennas, it is necessary to provide the common feed structure 1 with only the feed terminal 11, where the feed terminal 11 is externally connected to the matching circuit, the matching circuit is configured to switch a working antenna branch among the plurality of antenna branches, and the matching circuit may be an existing circuit including capacitors and/or inductors. The matching circuit includes a plurality of matching sub-circuits respectively corresponding to different antenna branches, and different matching sub-circuits are switched according to the antenna branch to be used. The specific structure of the matching circuit is not limited in the embodiments of this application. In this way, when different communication bands need to be used, the matching circuit can be used to switch to different antenna branches, thus achieving multiband coverage required for Sub 6G antennas.

Figure 2C:
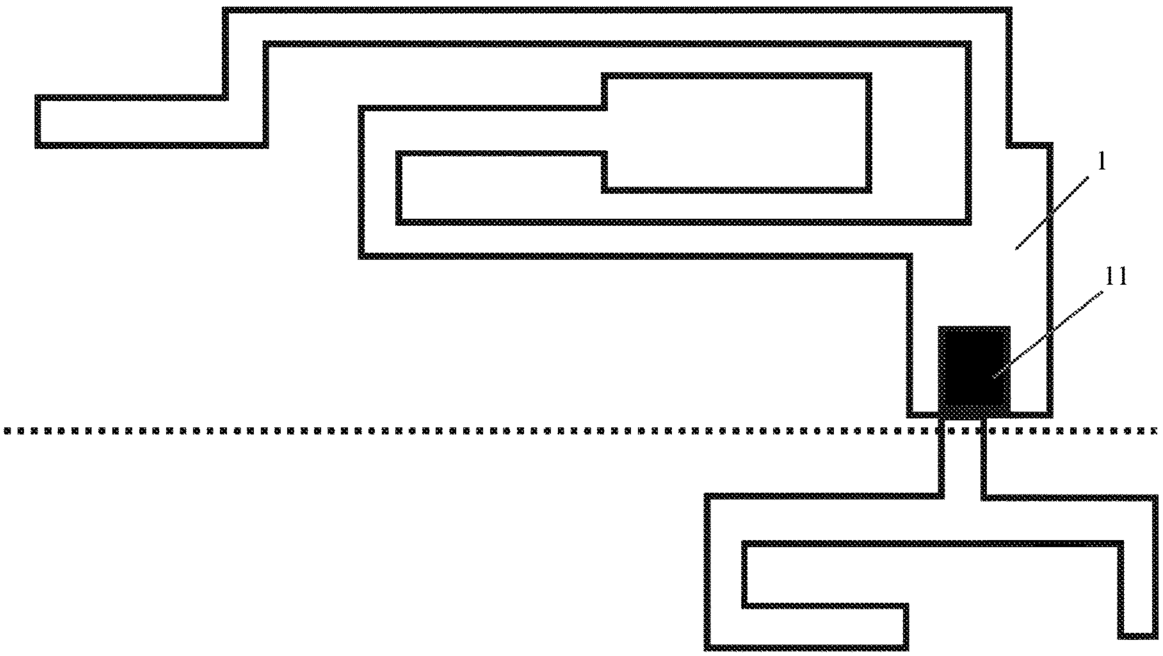
FIG. 2*c* is a fourth schematic structural diagram of an antenna module of an electronic device according to an embodiment of this application.

Refer to FIG. 2*c*. FIG. 2*c* shows a planar structure of another antenna module. This antenna module differs from the antenna module shown in FIG. 1 to FIG. 2*b* in that the first group of antenna branches of the antenna module has the same number of antenna branches as the second group of antenna branches thereof, both being 2. The two antenna branches in the first group of antenna branches correspond to any two of the N1 band, N41 band, N78 band, and N79 band, and the two antenna branches in the second group of antenna branches respectively correspond to the other two of the N1 band, N41 band, N78 band, and N79 band. The antenna branches in FIG. 2*c* are monopole antennas, and therefore the common feed structure is provided with a feed terminal 11. As for other structural features and limitations on the distance between antenna branches, reference may be made to the corresponding descriptions of the antenna module shown in FIG. 1 to FIG. 2*b*, which will not be described herein again.

Figure 3:
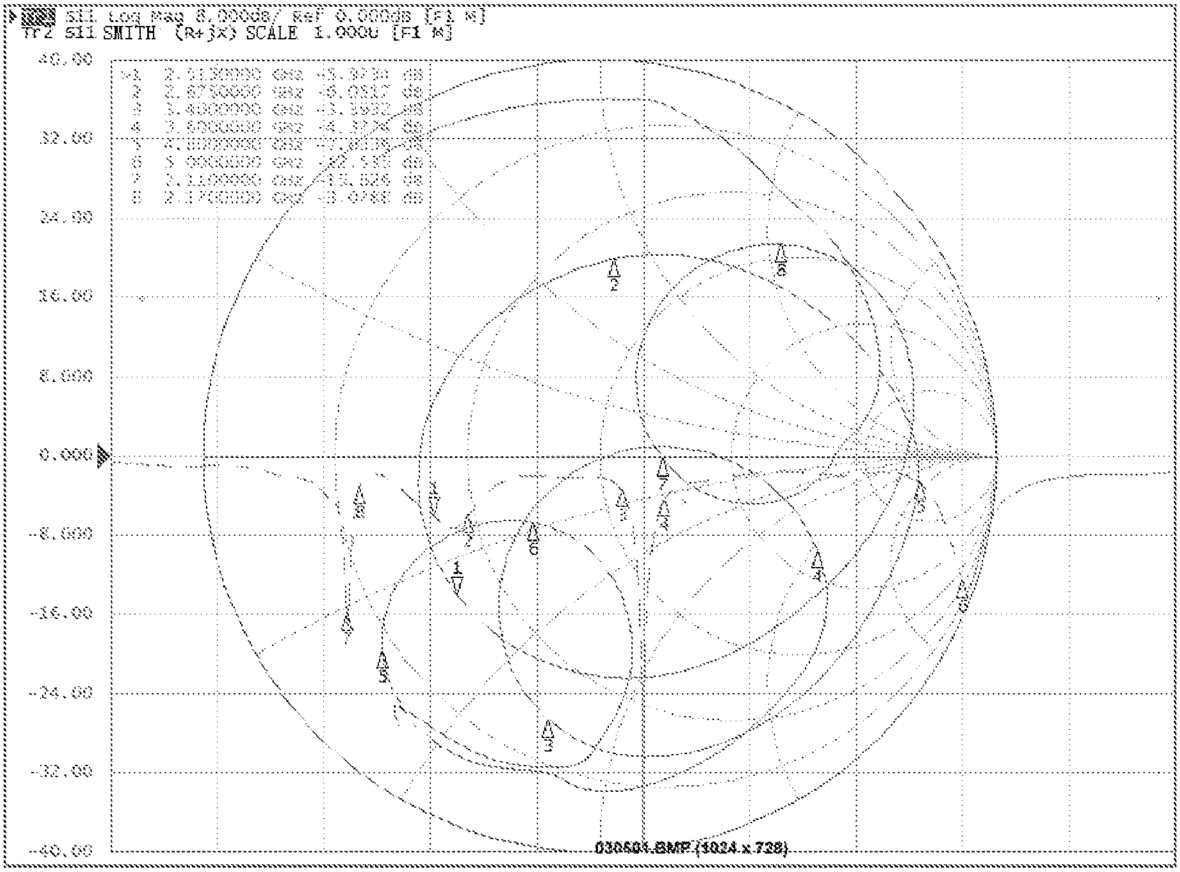
FIG. 3 is a schematic diagram of antenna return loss according to an embodiment of this application.

Refer to FIG. 3. FIG. 3 shows antenna return loss under use of the antenna module in FIG. 1, where a dotted line represents a schematic curve of the return loss, and real lines represent Smith charts.

Figure 4:
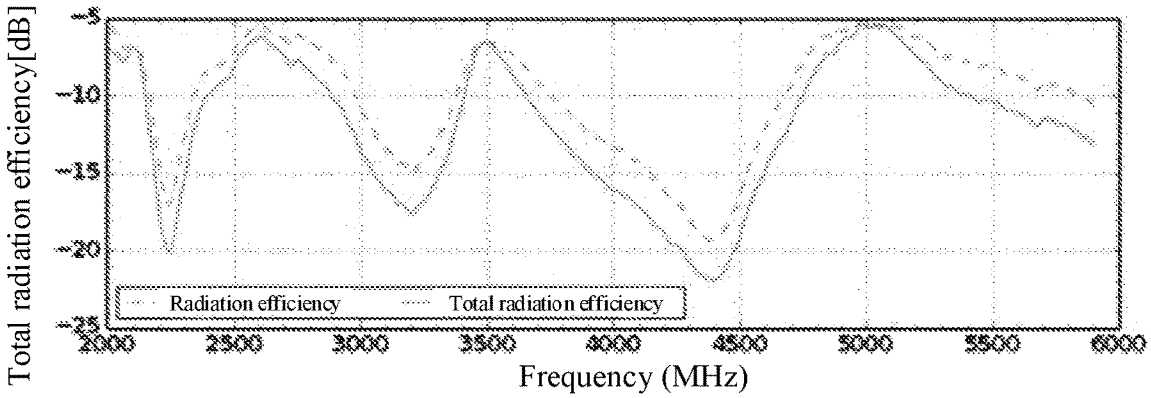
FIG. 4 is a schematic diagram of antenna efficiency according to an embodiment of this application.

Refer to FIG. 4. FIG. 4 shows antenna efficiency under use of the antenna module in FIG. 1, where a dotted line represents radiation efficiency (Radiation Efficiency), and a solid line represents system efficiency (Total radiation Efficiency).

With reference to FIG. 3 and FIG. 4, it can be found that use of the antenna module in the embodiments of this application can effectively reduce the antenna return loss and improve the antenna efficiency.

The embodiments of this application further provide an electronic device, including the antenna module shown in any one of FIG. 1 to FIG. 2*c*.

Specifically, the common feed structure and the first group of antenna branches of the antenna module are disposed on the inner surface of a housing of the electronic device, and the second group of antenna branches of the antenna module are disposed on the outer surface of the housing of the electronic device.

It should be noted that in this specification, the terms "include", "comprise", or any of their variants are intended to cover a non-exclusive inclusion such that a process, method, article, or apparatus that includes a list of elements not only includes those elements but also includes other elements that are not expressly listed, or also includes elements inherent to such process, method, article, or apparatus. In absence of more constraints, an element preceded by "includes a/an . . . " does not preclude the presence of other identical elements in the process, method, article, or apparatus that includes the element. In addition, it should be noted that the method and apparatus in the embodiments of this application are not limited to performing functions in the order shown or discussed, but may also include performing the functions at substantially the same time or in reverse order depending on the functions involved. For example, the method described may be performed in an order different from that described, where various steps may be also added, omitted, or combined. In addition, features described with reference to some examples may be combined in other examples.

The foregoing describes the embodiments of this application with reference to the accompanying drawings. However, this application is not limited to the foregoing specific embodiments. The foregoing specific embodiments are merely illustrative rather than restrictive. As inspired by this application, a person of ordinary skill in the art may develop many other forms without departing from the principle of this application and the protection scope of the claims, and all such forms fall within the protection scope of this application.

What is claimed is:

1. An electronic device, comprising an antenna module, wherein the antenna module comprises a plurality of antenna branches;

a common feed structure is disposed between the plurality of antenna branches;

the plurality of antenna branches are divided into a first group of antenna branches and a second group of antenna branches;

the first group of antenna branches and the second group of antenna branches respectively correspond to different communication bands; and the common feed structure and the first group of antenna branches are disposed in a non-metallic area of an inner surface of a housing of the electronic device, and the second group of antenna branches are disposed in a non-metallic area of an outer surface of the housing of the electronic device;

wherein two antenna branches with the shortest distance between the first group of antenna branches and the second group of antenna branches have a distance greater than or equal to 0.5 mm in a first direction, wherein the first direction is a direction of an orthographic projection of the second group of antenna branches with respect to the first group of antenna branches.

2. The electronic device according to claim 1, wherein each of the plurality of antenna branches has a physical length corresponding to a different communication band.

3. The electronic device according to claim 1, wherein a band difference between communication bands corresponding to the two antenna branches with the shortest distance is less than a preset threshold, and the two antenna branches with the shortest distance have a distance greater than or equal to 0.5 mm in a second direction, wherein the second direction is perpendicular to the first direction.

4. The electronic device according to claim 2, wherein in a case that the plurality of antenna branches are inverted F antennas, the common feed structure is provided with a feed terminal and a ground terminal, wherein the feed terminal is connected to a matching circuit.

5. The electronic device according to claim 2, wherein in a case that the plurality of antenna branches are monopole antennas, the common feed structure is provided with a feed terminal, wherein the feed terminal is connected to a matching circuit.

6. The electronic device according to claim 2, wherein communication bands corresponding to the plurality of antenna branches comprise at least one of the following:

N1 band;

N41 band;

N78 band; and

N79 band.

7. The electronic device according to claim 2, wherein communication bands corresponding to the plurality of antenna branches comprise at least one of the following:

2.4G WiFi band; and

5G WiFi band.

8. The electronic device according to claim 1, wherein one antenna branch in the second group of antenna branches corresponds to any one of the N1 band, N41 band, N78 band, and N79 band, and three antenna branches in the first group of antenna branches respectively correspond to the other three of the N1 band, N41 band, N78 band, and N79 band.

9. The electronic device according to claim 1, wherein two antenna branches in the first group of antenna branches correspond to any two of the N1 band, N41 band, N78 band, and N79 band, and two antenna branches in the second group of antenna branches respectively correspond to the other two of the N1 band, N41 band, N78 band, and N79 band.

* * * * *